May 5, 1964

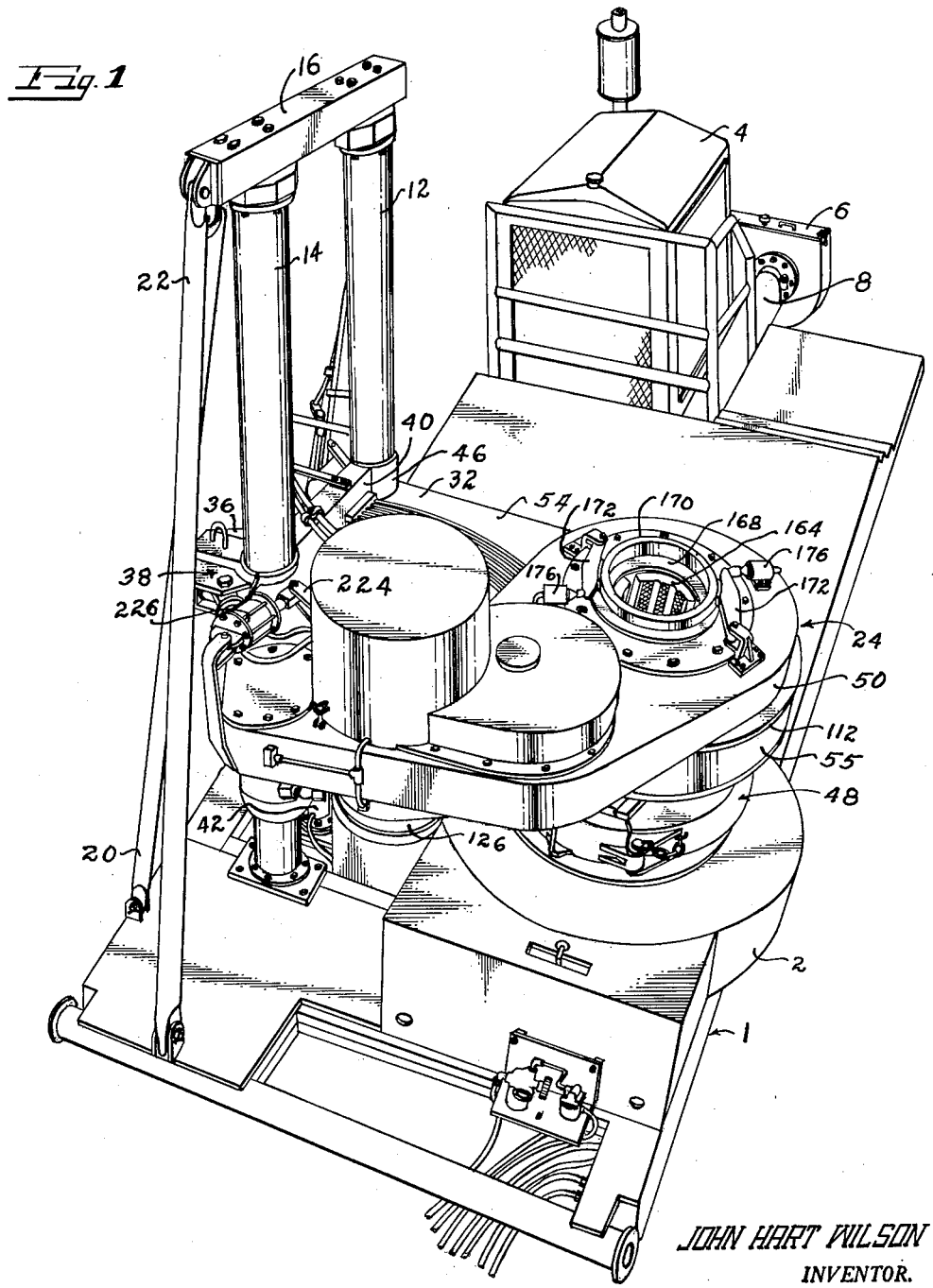

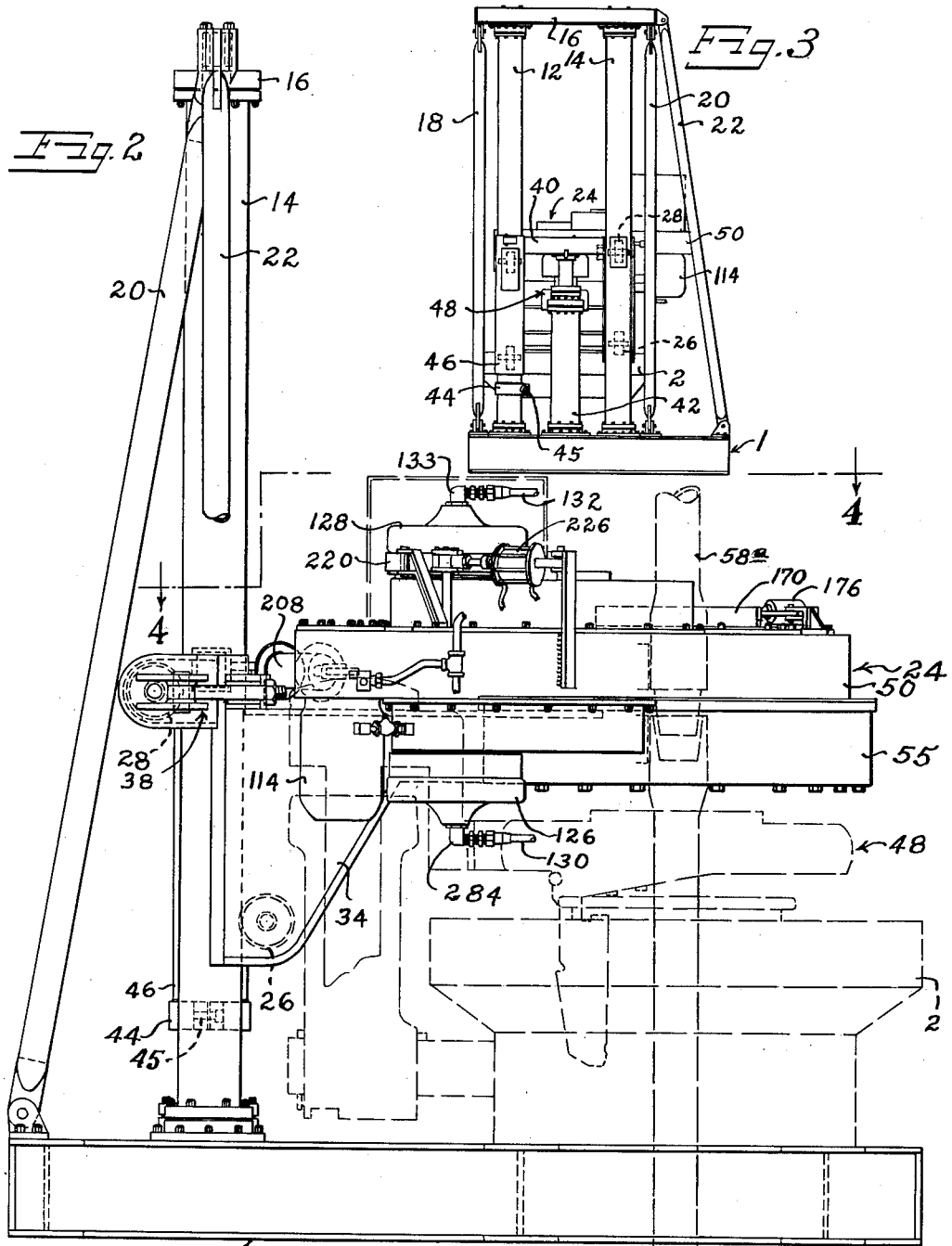

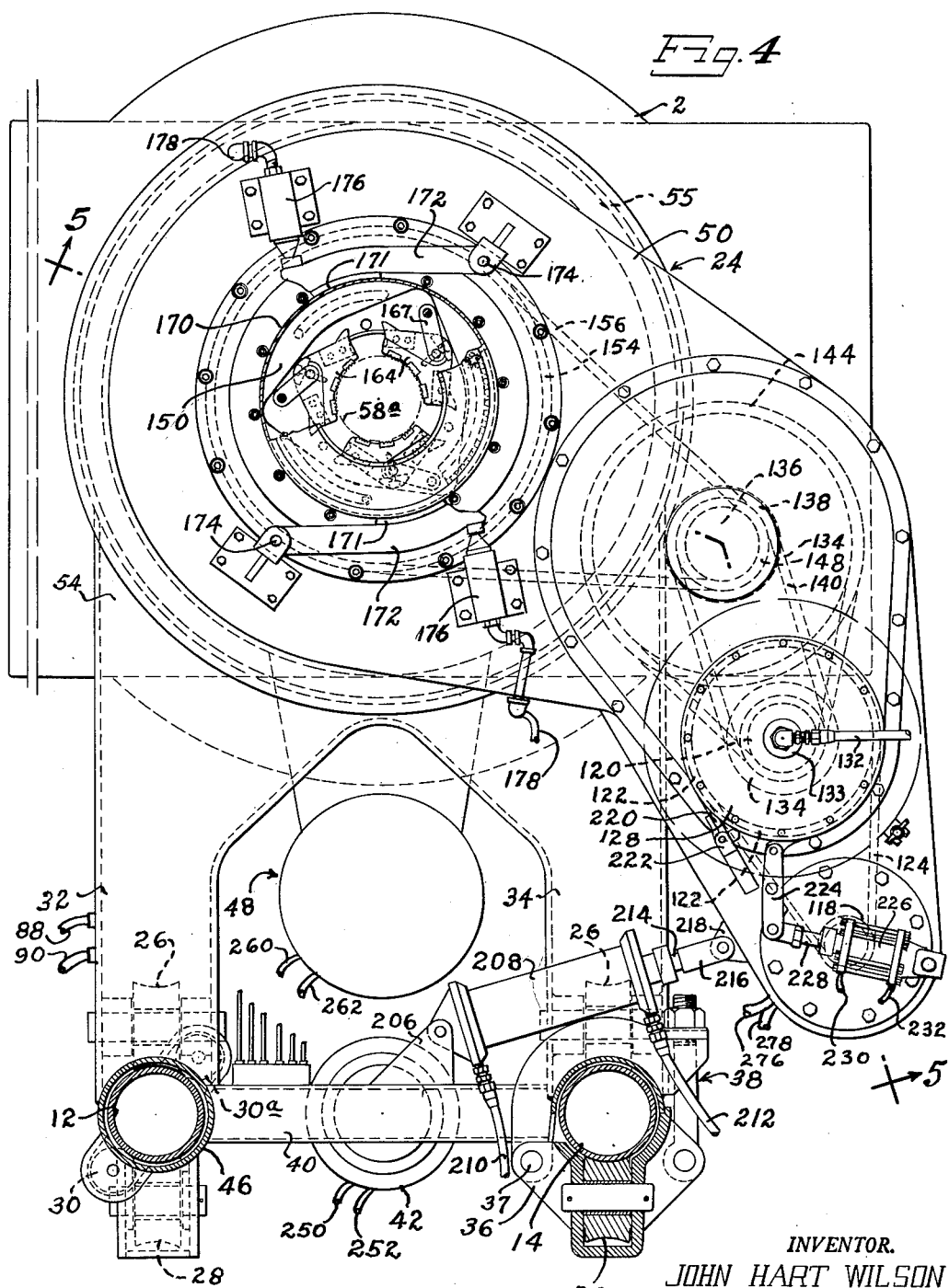

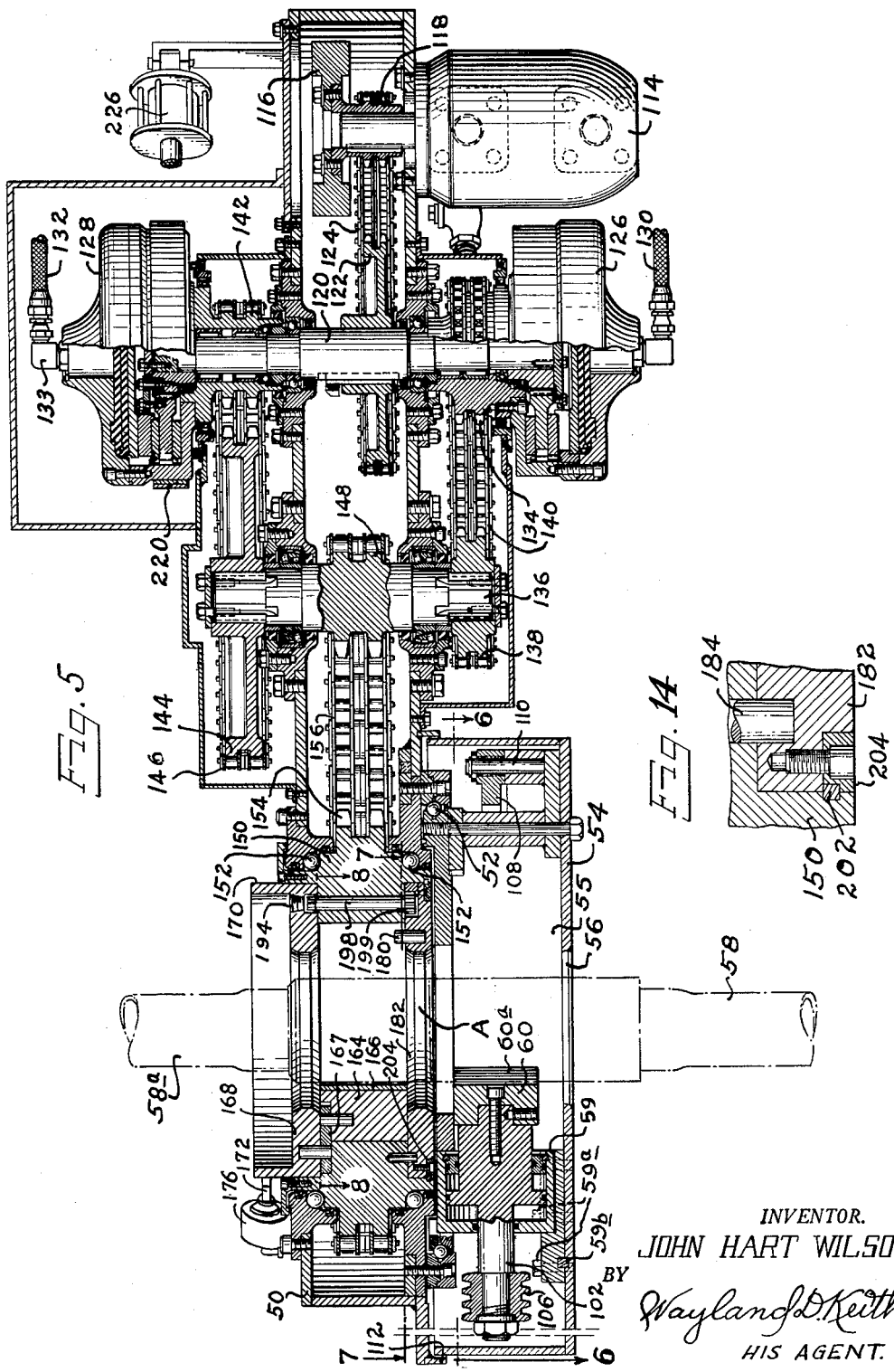

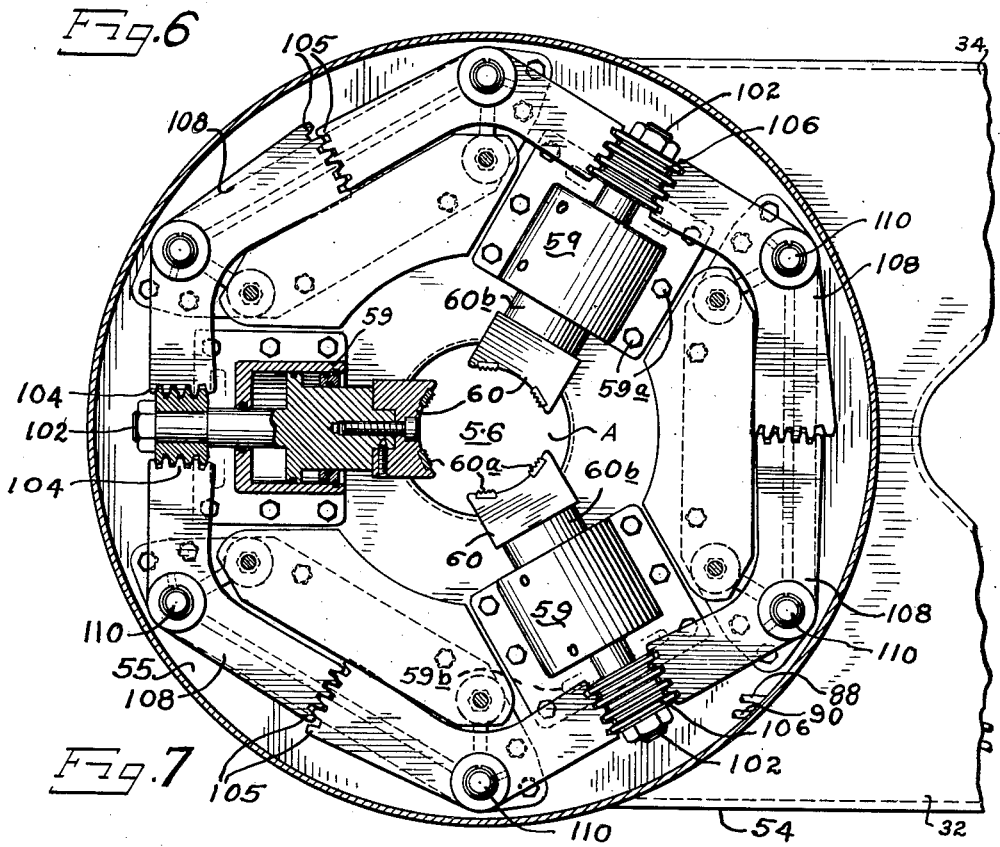

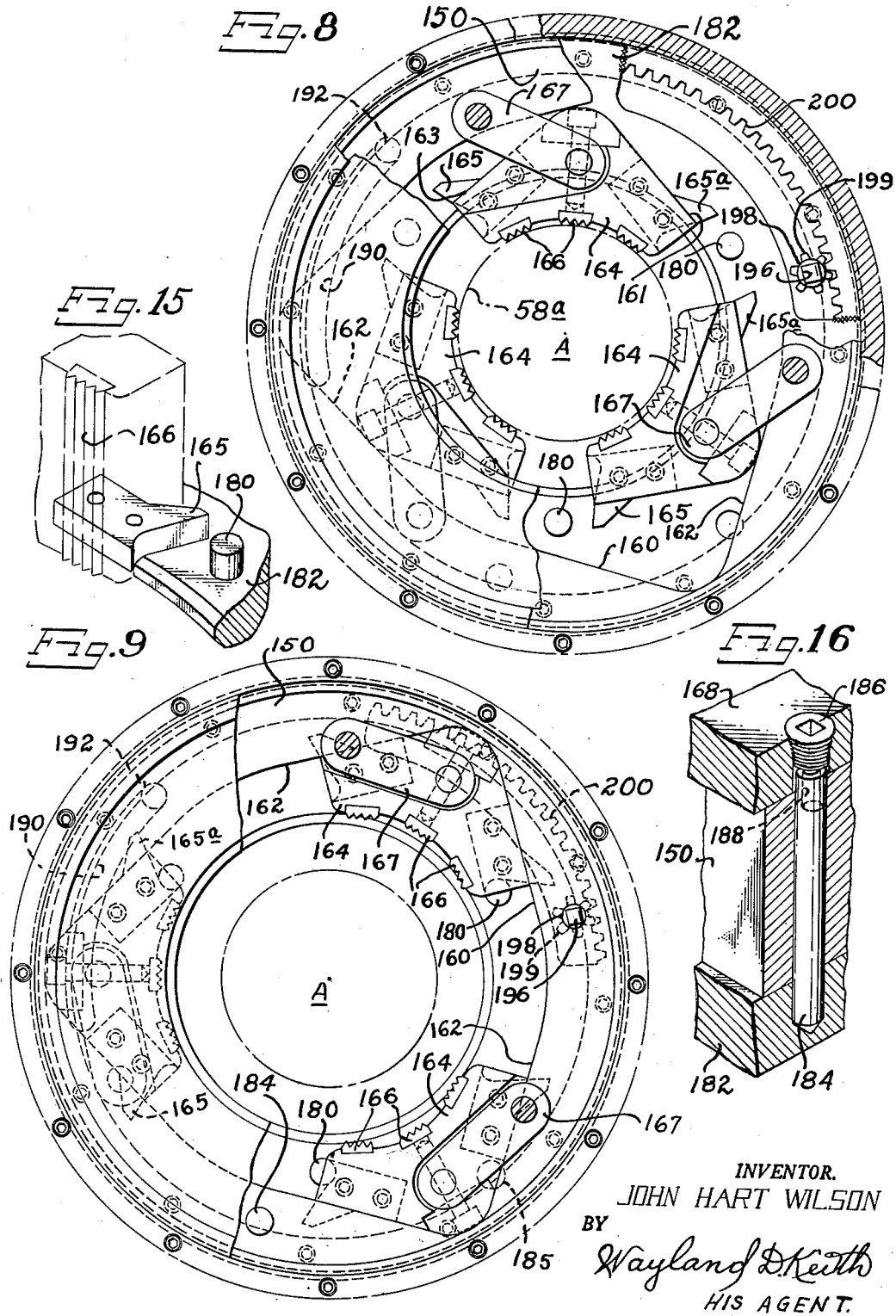

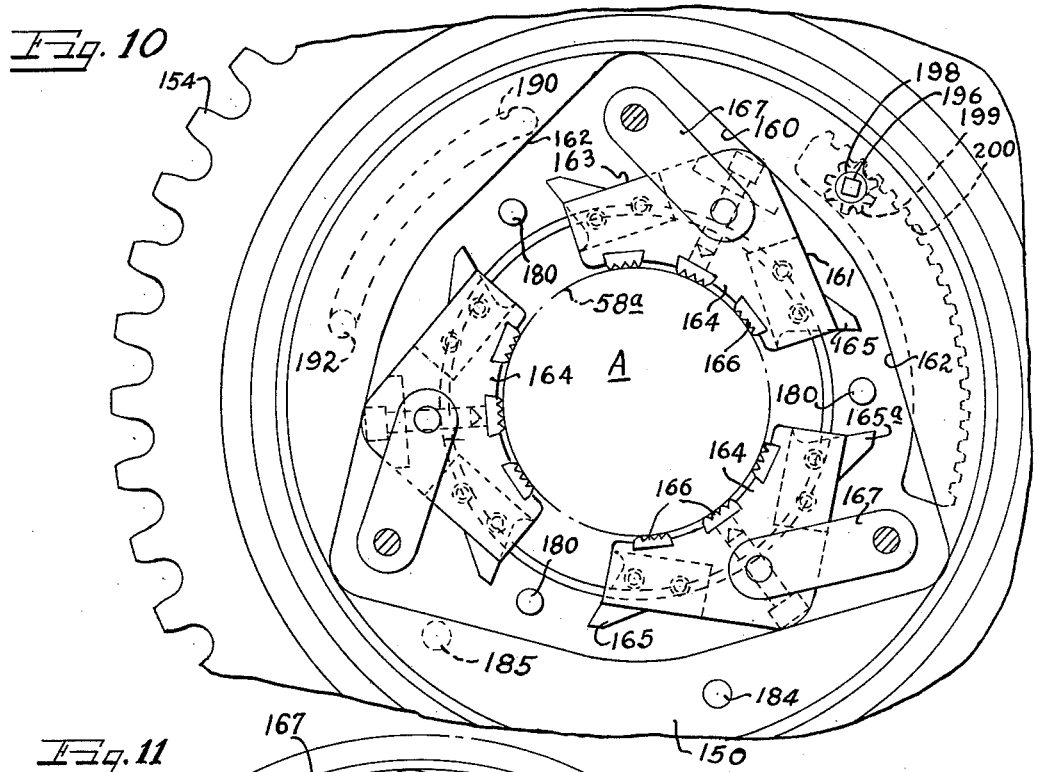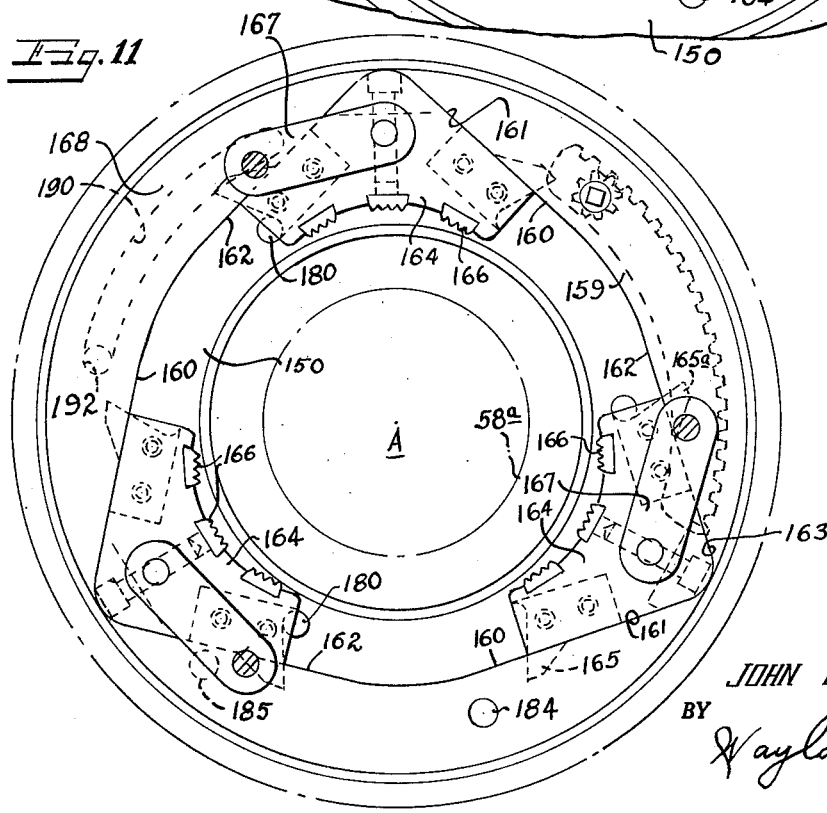

J. H. WILSON 3,131,586

MECHANISM FOR MAKING UP AND BREAKING OUT SCREW THREADED
JOINTS OF DRILL STEM AND PIPE

Filed May 11, 1960

JOHN HART WILSON
INVENTOR.

BY
Wayland D. Keith
HIS AGENT

May 5, 1964 J. H. WILSON 3,131,586
MECHANISM FOR MAKING UP AND BREAKING OUT SCREW THREADED
JOINTS OF DRILL STEM AND PIPE
Filed May 11, 1960 9 Sheets-Sheet 9

JOHN HART WILSON
INVENTOR.

BY
Wayland D. Keith
HIS AGENT

United States Patent Office 3,131,586
Patented May 5, 1964

3,131,586
MECHANISM FOR MAKING UP AND BREAKING OUT SCREW THREADED JOINTS OF DRILL STEM AND PIPE
John Hart Wilson, P.O. Box 1031, Wichita Falls, Tex.
Filed May 11, 1960, Ser. No. 28,273
4 Claims. (Cl. 81—52.4)

This invention relates to improvements in machines for making up and breaking out tool joints, pipe and the like, and more particularly to a machine which will enable the screwing together of drill stem, pipe and the like with a predetermined torque and the breaking out or unscrewing of drill stem, pipe and the like.

Various devices have been proposed heretofore for making up and breaking out pipe joints, drill stem and the like, but these, for the most part, if sufficiently strong and sturdy to break out the most tightly stuck joints, would of necessity be so large and cumbersome as to make the use thereof impractical, and if sufficiently small as to be portable for moving from one well location to another, they would not exert sufficient torque to break out difficult joints or unscrew pipe which became galled or stuck together.

The present device may be so constructed that it will make-up or break-out tool joints of drill stem or screw to unscrew pipe joints or the like with a torque up to a million inch pounds, and yet the device is readily movable from one well location to another.

An object of this invention is to provide a device for making up and breaking out tool and pipe joints which will exert a uniform torque on all joints being secured together or separated.

Another object of the invention is to provide a device for making up and breaking out tool and pipe joints, which will generate extremely high torque for a portion of a turn, and whereby high torque, but less than that initially exerted, may be transmitted to the pipe to complete breaking out the joint, until the joint is sufficiently loose that the tool joint or pipe may be spun until the screw threaded joint is separated.

Still another object of the invention is to provide a make-up and break-out device which is readily adjustable as to height to accommodate the stopping of the various tool joints or pipe joints at various heights.

A further object of the invention is to provide a make-up and break-out device which may be readily swung into and out of alignment with the axis of the rotary table of the drilling rig on which it is being used.

Yet another object of the invention is to provide a rotary table, an automatic drill stem supporting slip, and a make-up and break-out device in a single composite unit which may be readily used to perform the desired functions of holding the drill stem, and of making up or breaking out the drill stem or pipe.

Yet a further object of the invention is to provide a make-up and break-out device which can be used effectively either for breaking out extremely tight screw threaded drill stem, or pipe joints.

With these objects in mind and others which will become manifest as the description proceeds, reference is to be had to the accompanying drawings in which like reference characters designate like parts in the several views thereof, in which:

FIG. 1 is a perspective view of the make-up and break-out device taken from an end and a side, and looking down thereon, to show the details of construction, with the control panel removed therefrom;

FIG. 2 is a side elevational view of the make-up and break-out device shown in full outline, with the rotary table and the automatic slips being shown in dashed outline, and showing drill stem, in dashed outline, therein;

FIG. 3 is a view taken at right angles to FIG. 2, and being on a reduced scale, showing the details of construction thereof;

FIG. 4 is a sectional view taken on the line 4—4 of FIG. 2, looking in the direction indicated by the arrows, with parts being broken away, with parts shortened and with parts shown in full outline, to bring out the details of construction, and showing a portion of drill stem in dot-dash outline;

FIG. 5 is a longitudinal sectional view taken on the line 5—5 of FIG. 4, looking in the direction indicated by the arrows;

FIG. 6 is a sectional view taken on the line 6—6 of FIG. 5, looking in the direction indicated by the arrows;

FIG. 7 is a sectional view taken on the line 7—7 of FIG. 5, looking in the direction indicated by the arrows;

FIG. 8 is a sectional view taken on the line 8—8 of FIG. 5, looking in the direction indicated by the arrows and showing the device in make-up position with the slips thereof being shown in engaged position;

FIG. 9 is a sectional view similar to FIG. 8 but showing the slips in disengaged position;

FIG. 10 is a sectional view taken on the same line as FIG. 8, but showing the slip engaging cam member shifted with respect to the position shown in FIG. 8, to enable breaking out screw threaded joints, and showing the slips in engaged position;

FIG. 11 is a view similar to FIG. 10, but showing the pipe engaging dies in disengaged position;

FIG. 12 is a diagrammatic view of the piping arrangement, showing the various valves and operating mechanisms attached thereto.

FIG. 14 is a fragmentary detailed sectional view of the device, showing a bottom retaining ring, and also showing the locking pin arrangement, taken on the line 14—14 of FIG. 7;

FIG. 15 is a perspective view of the slip engagement device, with portions being shown in full outline and portions being shown in dashed outline, of the pipe engaging die elements, and showing a stop pin associated therewith; and FIG. 16 is a fragmentary perspective view showing the removable locking pin therein, and showing a screw plug thereabove.

Figure 13:
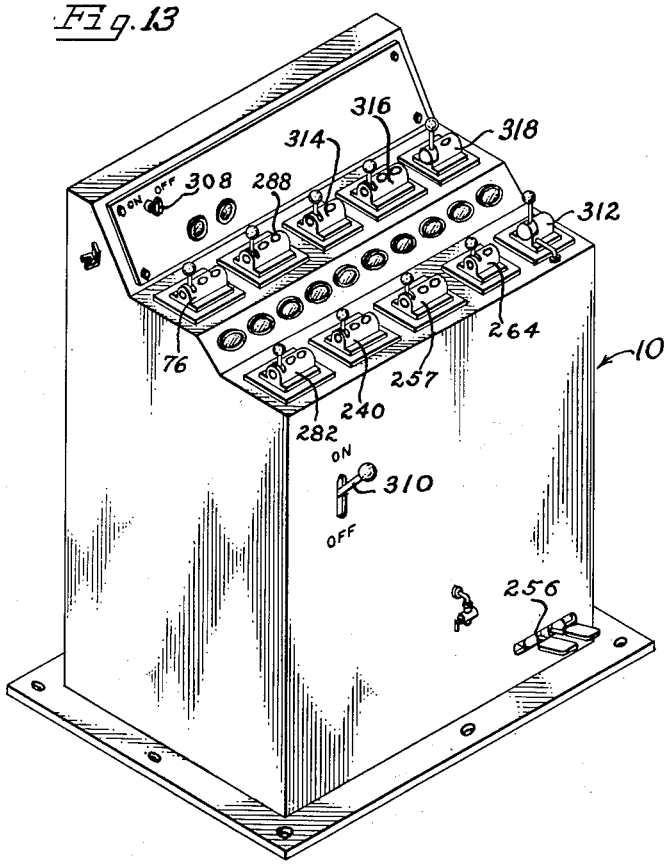
FIG. 13 is a perspective view of the control panel unit showing the operating valves thereon.

With more specific reference to the drawing, FIG. 1 represents a composite unit embodying a base which is designated generally at 1, on which base is mounted a rotary well drilling table 2, which rotary well drilling table 2 is driven by a power unit 4, which drives through chain transmission housing 6 and a shaft within housing 8, in the manner set forth in my Patent No. 2,911,193, issued Nov. 3, 1959, for Individual Power Drive Unit for Rotary Tables. A control unit designated generally by the numeral 10, as shown in FIG. 13, is shown apart from the base 1 and in perspective, to better illustrate the details of construction.

Upstanding standards or columns 12 and 14 are mounted on base 1 at one side thereof, which standards are braced by a header 16 which extends between the upper ends thereof so as to hold the standards 12 and 14 in vertical, parallel relation. Angular braces 18, 20, and 22 are secured to the header 6 and base 1 so as to maintain the upright standards 12 and 14 substantially at a right angle to the base 1. Angular braces 18, 20, and 22 are attachably secured to base 1 at their lower ends and to header 16 at their upper ends so as to maintain the upright standards 12 and 14 in rigid braced relation with respect to base 1.

The upright standards form columns on which the make-up and break-out mechanism 24 is movably mounted to enable the mechanism to be moved therealong with respect to the base 1. Concave rollers 26 are journaled on the make-up and break-out device adjacent the columns 12 and 14 and in rolling relation therewith on the lower side of make-up and break-out device so as to be in bearing relation with the upright standards 12 and 14. Concave rollers 28 are positioned on the opposite side of upstanding standards 12 and 14 and are in bearing relation with the standards 12 and 14, so as to bias the weight of said make-up and break-out mechanism on said rollers to maintain said make-up and break-out mechanism 24 in a substantially horizontal plane. Further rollers 30 and 30a are mounted on vertical axes and are spaced apart on opposite sides of upright standards 12 so as to roll around column 12 to support a portion of the weight of make-up and break-out mechanism 24 as it is swung about the axis of column 12.

The make-up and break-out mechanism 24 has outwardly extending bifurcated members 32 and 34 of frame or support 54 to support the weight of the mechanism and to transfer the weight to the upright standards 12 and 14. The outstanding bifurcated member 32 surrounds upright standard 12 and has rollers 26 and 28 mounted on opposite sides and spaced apart so as to support the major portion of the weight of the mechanism 24, and further rollers 30 and 30a are mounted on vertical axes and spaced apart, with the roller 30 being the uppermost roller on one side, and the roller 30a being the lowermost roller on the other side, and being adjacent to and below the make-up and break-out device 24 so as to enable the swinging of the make-up and break-out mechanism 24 about upright standard 12 as an axis. The outstanding leg member 34 is attachably connected to upright standard 14 by a hinge and latch mechanism, as will be evident from FIGS. 2 and 4. The bifurcated leg member 34 has a hinge member 36 on one side thereof and a swing bolt and lug connection, generally designated at 38, on the opposite side thereof, to enable the swing bolt thereof to be disconnected so as to swing hinge member 36 about pivot pin 37 to enable the make-up and break-out mechanism 24 to pivot about the axis of upright standard 12.

A beam 40 extends between the outwardly extending bifurcated member 32 and the hinge joint on bifurcated portion 34, as is best seen in FIGS. 3 and 4. A hydraulic jack 42 is mounted on base 1 and extends upward in bearing relation with the lower side of beam 40 so as to raise and lower make-up and break-out mechanism 24, upon application of hydraulic pressure thereto. A support or set collar 44 is mounted on upright standard 12 below a tubular sleeve 46 which extends downward from outwardly extending bifurcated member 32 so that the make-up and break-out mechanism 24 may be supported on the set collar 44 by tightening bolt 45 to maintain the set collar in fixed relation with respect to standard 12, thereby enabling swing bolt and lug arrangement 38 to be disengaged and swing hinge member 36 around hinge pin 37, thereby enabling the weight of the make-up and break-out mechanism 24 to be supported on upright standard 12 by set collar 44, whereupon, the make-up and break-out mechanism 24 may be swung arcuately about the axis of upright standard 12, after the hydraulic jack mechanism has been lowered out of engagement with beam 40. It will be seen that the hydraulic jack 42 may be used to elevate or lower the rotary make-up and break-out mechanism 24 to the desired level, either for use or for lowering the mechanism so that the sleeve 46 will abut with set collar 44.

The make-up and break-out device 24 is used in conjunction with a power slip mechanism, designated generally at 48, and shown in dashed outline in FIG. 3, which power slip mechanism is in general use, and forms no part of the invention per se. It is preferable to have the power slip mechanism hydraulically actuated, in view of the fact that the major portion of the mechanisms of the present device are hydraulically actuated, and which can be connected to a central hydraulic pumping mechanism 82 which is driven by power unit 4.

The make-up and break-out mechanism 24 has a hollow housing 50, which housing is preferably oil tight so a lubricant may be contained therein for the lubrication of the various chains, sprockets and bearings within said housing. The housing 50 is mounted on ball bearing 52 which journals housing 50 with respect to frame or support member 54, which frame or support 54 has the bifurcated members 32 and 34 formed integral therewith. The ball bearing 52 enables arcuate movement of housing 50 and the mechanism therein to rotate through a limited arc, which will be more fully brought out hereinafter.

The frame or support member 54 forms a housing 55 at the outer end, which housing has an opening formed transversely therethrough, which opening is normally in axially aligned relation with the axial opening in the rotary table 2, through which openings drill stem 58 is adapted to pass, as will best be seen in FIG. 5. Three hydraulic cylinders 59 are spaced equidistant about hole 56 within housing 55 and are secured to support member 54, which hydraulic cylinders are double acting and are adapted to urge pipe engaging dies 60a mounted in die heads 60 into engagement with the drill stem 58, which holds drill stem 58 against rotation in either direction. The drill stem 58 is lowered into the power slip mechanism 48 and the slips thereof are lowered into the rotary table 2 so as to cause the slips of the power slip mechanism to engage and support the weight of the drill stem thereon and thereby.

Upon the lowering of power slip mechanism 48, a portion 49a of the movable plunger of the slip device 48 engages a projection 70 on valve 72 to direct air from air supply conduit 74 through valve 72 to manually controlled air valve 76, whereby air can be directed to the double acting valve actuator 78, which may be of the piston type to actuate a spool-like plunger in four-way valve 80, which valve may be actuated by double acting, pneumatic valve actuator 78 to position the valve to direct hydraulic pressure from hydraulic supply pump 82 through conduit 84, through four-way hydraulic valve 80 and into conduit 88 to urge the piston of the hydraulic cylinders inward to cause engagement of pipe engaging die heads 60 with drill stem 58, and when the valve 80 is switched into the opposite position, the hydraulic fluid will be directed through conduit 90 and into cylinders 59 to urge the pistons and die heads outward. The support 54 has double action hydraulic cylinders 59 secured thereto by bolts 59a, with a transverse key 59b seated in the bottom of the support member 54 and in the base of the hydraulic cylinder 59. Each of the hydraulic cylinders 59 has an outwardly extending piston guide rod 102, which extends outwardly through a packing gland in the end of the respective hydraulic cylinders 59. A grooved member 106 is fitted on and secured to outwardly extending piston guide rod 102. Toothed bell crank members 108 are fitted on respective pivot pins 110, which pins are spaced between the hydraulic cylinders 59 and are secured to housing 50 so that each bell crank has one toothed end 104 in interengagement with a grooved member 106 on outwardly extending piston guide rod 102. The other end 105 of the respective toothed bell crank members has arcuate gear teeth formed therein and which teeth are in mesh with the teeth on the adjacent end of the respective complementary bell crank 108, so that upon movement of one piston within cylinder 59 each of the pistons within the respective cylinders 59 will be moved into and out of the respective hydraulic cylinders, so that the dies 60a on pipe engaging die heads 60 will simultaneously engage, centralize, grip and hold drill stem 58, or such other pipe or screw threaded element as might be therein.

The die heads 60 are each attachably secured to the inwardly extending portion of the piston rod 60b so that the heads can be individually removed, and heads of different contours fitted thereon, furthermore, the respective dies 60a in the die heads 60 may be removed and replaced when desirable or when they become worn.

The housing 50 of the break-out and make-up mechanism 24 has a down turned annular rim 112 on the lower side thereof, which rim is positioned in telescoping relation to the housing 55 of the support frame 54. The annular rim 112 prevents entrance of foreign matter into housing 55 on frame 54, but at the same time permits relative arcuate movement between these parts. The bearing 52 has a portion thereof fixedly secured to the lower portion of the housing 50 of the make-up and break-out mechanism 24 and the other portion of bearing 52 is secured to housing 55 of support frame 54.

The housing 50 of make-up and break-out mechanism 24 has a prime mover element, such as a hydraulically actuated motor 114, which is attachably secured to the housing, and which motor has a shaft extending therefrom and into housing 50. A fly wheel 116 is fixedly secured to the shaft of the motor 114. The shaft of the hydraulic motor 114 has a sprocket 118 mounted thereon, which sprocket is keyed to this shaft. The housing 50 has countershaft 120 journaled in bearings therein, the axis of which countershaft is substantially parallel to the axis of the shaft of the hydraulic motor 114. A sprocket 122 is keyed to countershaft 120. A transmission chain 124 surrounds sprockets 118 and 122 in driving relation. The countershaft 120 extends outward from each side of housing 50 and on each end of which countershaft the respective air actuated clutches 126 and 128 is secured, each of the air actuated clutches has a hose 130 and 132 respectively connected thereto and leading thereto to direct air to the respective clutches, as will be more fully brought out hereinafter.

A sprocket 134 is journaled on countershaft 120 and has the hub portion thereof connected in driving relation with the driven ring portion of air actuated clutch 126, so the sprocket 134 may be selectively engaged in driving relation with countershaft 120 upon engaging air actuated clutch 126.

A jack shaft 136 is journaled in bearings within housing 50, the axis of which shaft is parallel to the axis of countershaft 120. One end of the jack shaft 136 has a sprocket 138 fixedly secured thereto, which sprocket 138 is in aligned driving relation with sprocket 134 on countershaft 120. A transmission drive chain 140 surrounds sprockets 134 and 138 so as to connect shaft 136 in driving relation with the hydraulic motor 114 upon engagement of the clutch 126.

It is preferable to have the sprocket 138 of the same size or even smaller in size than the sprocket 134 so that the jack shaft 136 may be driven at a relatively high speed to enable the drill stem or pipe to be spun out rapidly after the joint has been loosened.

The countershaft 120 has a further sprocket 142 journaled thereon, which sprocket 142 has the hub portion thereof connected in driving relation with a driven portion of air actuated clutch 128, so upon engagement of the clutch 128, the sprocket 142 will be driven thereby. A sprocket 144 is mounted on jack shaft 136 so as to be in aligned driving relation with sprocket 142 mounted on countershaft 120. A transmission drive chain 146 surrounds sprockets 142 and 144, so as to connect jack shaft 136 in driving relation with the hydraulic motor 114 when clutch 128 is engaged.

It is preferable to have sprocket 144 of larger diameter than sprocket 142 so as to give a greater reduction of speed to shaft 136 so that the screw joint may be loosened by turning the pipe sections slowly relative to each other with a relatively high torque, so that one portion of the drill stem or pipe can be rotated with respect to the other portion of drill stem or pipe to exert a high torque thereon for breaking out the screw threaded joint thereof, if the joints are not stuck or galled. However, for joints which are stuck or galled, a further mechanism is employed, as will be brought out more in detail hereinafter.

The jack shaft 136 has a sprocket 148 thereon, which is preferably made integral therewith so as to withstand relatively high torque. A rotatable drive ring 150 is mounted on bearings 152 within housing 50, which drive ring 150 has an axial opening A therethrough for the passage of drill stem or pipe 58 therethrough. The axial opening through the drive ring 150 is so shaped as to form cam faces to cause engagement of pipe engaging slips with the drill stem or pipe when a mechanism is selectively operated, as will be brought out more in detail hereinafter.

The drive ring 150 has a sprocket 154 formed on the periphery thereof, which sprocket is in driving alignment with sprocket 148 on jack shaft 136. A transmission chain 156 surrounds sprockets 148 and 154 and connects these sprockets in driving relation, so upon rotation of hydraulic motor 114, and with either the high speed clutch 126 or the low speed clutch 128 engaged, the rotatable drive ring 150 will be rotated. The hydraulic motor 114 is reversible, therefore, the rotatable drive ring 150 may be rotated in either direction, at either high speed or low speed, and may be used to perform either a making up or breaking out operation on drill stem or pipe. Furthermore, the air pressure on the respective air supply lines 130 and 132 may be so regulated as to exert a predetermined pressure on the clutch actuating element so as to exert a predetermined torque on the pipe being screwed together, thereby preventing the joints from being too tightly screwed together, which might result in galling the threads, stripping the threads, or other damage.

The rotatable drive ring 150 has a modified triangular axial opening A therein, the sides of which opening form a plurality of cam faces 160 and a plurality of cam faces 162, all of the cam faces 160 being of the same angle in one direction with respect to the axis of the drive ring 150, and all of the cam faces 162 being of the same angle and in the same direction with respect to the axis of drive ring 150 but in inverse relation to the cam faces 160. Each cam face 160 on drive ring 150 is complementary to a face 161 of the slip or die holder 164, and each cam face 162 of ring 150 is complementary to a face 163 of the slip or die holder 164, which cam engaging faces 161 and 163 are on die holder 164. The angle of the faces 160 and 162 come closer to the axis of rotatable drive ring 150 as the angle cam engaging faces 161 or 163 of die holder 164 move along either of the respective faces 160 or along the respective faces 162, and the slip or die holder 164 will be urged inwardly radially as the linkages 167, which are secured to the respective slips or die holders 164 at one end and to a movable ring element 168 at the respective opposite ends thereof, the braking of ring 168 will cause relative arcuate movement between ring 168 and the rotatable drive ring 150 upon the retarding of ring 168 relative thereto, but since the ring 168 normally rotates in unison with rotatable member 150, a braking surface 170 has been provided on ring 168, which braking surface 170 is engageable by friction brake elements 171, which elements 171 are mounted on the respective arms 172 which are pivotally connected to the top of housing 50 by the respective pivot pins 174.

Air actuated cylinder and plunger elements 176 are mounted on housing 50 so an end of each plunger element will engage the respective distal ends of arms 172 to move the friction elements into braking engagement with the brake surface 170 upon application of air pressure to the respective conduits 178 so as to retard ring 168 to cause relative arcuate movement between the ring 168 and the drive ring 150.

The rotatable drive ring 150 has three equally spaced slip guide pins 180 removably fitted in holes in a relatively movable ring 182, which pins are upstanding therefrom and within the confines of cam faces 160 and 162 and spaced inward therefrom. The slip or die holder members 164 and 165a, one on each end thereof, one of which will engage the respective pins 180 when the ring 168 is moved relative to rotatable drive ring 150, which will move slip or die holders 164 along either the cam faces 160 or 162, depending on the positioning of pins 180 with respect to cam faces 160 and 162. The movable ring 182 is mounted directly below rotatable drive ring 150 and is normally keyed thereto by a removable lock pin 184, as will best be seen in FIG. 16. However, by removing screw plug 186 (FIG. 16) in ring 168, the lock pin 184 may be removed from engagement with rotatable drive ring 150 and ring 182, by threadably engaging a lifting element into a screw threaded hole 188 in the upper end of pin 184. In so doing, the ring 182 may be moved relative to rotatable drive ring 150 (FIGS. 7 and 11) through the length of arcuate slot 190 until a stop pin 192, upstanding from ring 182, abuts with the opposite end of arcuate slot 190. The movement of ring 182 relative to drive ring 150 may be accomplished by removing screw threaded plug 194 from ring 168 and fitting a wrench on the squared portion 196 of shaft 198, which shaft is journaled within rotatable drive ring 150. A pinion 199 is secured to the lower end of shaft 198 and is in meshed engagement with arcuate gear segment 200 on ring 182, which will enable ring 182 to be moved relative to rotatable drive ring 150, upon turning shaft 198.

When the ring 182 has been moved from the position as shown in FIGS. 7 and 11, which is the break-out position, through the length of arcuate slot 190, as shown in FIG. 9, which is the make-up position, the lock pin is replaced through the hole in ring 168 to engage hole 185 in ring 182 so as to hold the ring 182 in fixed relation with respect to rotatable drive ring 150, and the plug 186 is then replaced. The ring 182 is retained against axial movement with respect to drive ring 150 by lock ring segment 202, which lock ring segment engages an annular groove in the lower side of drive ring 150 and extends inward to be held in place by a ring 204 which is embedded in a groove within the lower side of ring 182, which ring 204 is bolted to the lower side of drive ring 150. This retains drive ring 150 and ring 182 against longitudinal separation but permits relative arcuate movement therebetween.

An apertured lug 206 is attached to beam 40 on the side thereof to which the hydraulic jack cylinder 208 is pivotally connected, which hydraulic jack cylinder has the respective conduits 210 and 212 connected to opposite ends thereof and being in fluid communication therewith. A piston rod 214 extends outward from an end thereof and has a clevis 216 attached thereto, which clevis interconnects with an apertured lug 218 which is secured near the distal end of housing 50 of make-up and break-out mechanism 24. The hydraulic cylinder 208 is adapted to impart an arcuate movement to housing 50 on bearing 52, relative to support or frame 54. This particular movement is only used to initially break difficult screw joints, as will be brought out more in detail hereinafter.

The low speed clutch 128 has a brake band 220 surrounding the external surface of the driven ring thereof in braking relation therewith, which brake band 220 is pivotally anchored to a bracket 222 at one end and is pivotally connected to a lever 224 at the opposite end, the pivot pin of which lever is mounted on housing 50. A fluid cylinder 226 is pivotally mounted on housing 50 at one end and has an outwardly extending connecting rod 228, which is pivotally attached to lever 224 at the opposite end, so as to actuate lever 224 to engage and disengage brake band 220 with the driven ring of clutch 128. A fluid conduit 230 is connected to one end of the fluid cylinder 226 and the fluid conduit 232 is connected to the opposite end thereof to supply fluid power for actuating the fluid cylinder 226.

The clutches 126 and 128 are air actuated clutches which are well known in the art of clutches, and utilize an elastomer, expansible tube-like element, which is in fluid communication with a source of air pressure, such as conduits 130 and 132 respectively. Clutches of this general character are disclosed in the following patents: Sanford, No. 2,589,291, which shows rotary air seal coupling 23; White et al., No. 2,395,239, Warman, No. 2,940,572, and Wilson, No. 2,944,790, each of which show axially expansible, elastomer tube-like elements, any of which clutches will perform the functions of the present clutches 126 and 128.

The device for making up and breaking out threaded tool joints and pipe connections has valves arranged on the control unit 10, as shown in FIG. 13, and which valves are shown diagrammatically in FIG. 12. The valve 240 is a four-way air valve to direct air from air supply conduit 74 into branch conduit 242 or into branch conduit 244, so as to direct air under pressure into a valve actuator 246 to move the spool type plunger within the valve 248 so as to direct hydraulic fluid from hydraulic fluid supply line 84 into valve 248 and thence either into conduit 250 or conduit 252, which respective conduits lead to opposite ends of hydraulic jack 42, with the fluid which is being exhausted passing out through return conduit 254 into hydraulic fluid reservoir R.

When the hydraulic jack 42 moves the beam 40 to the desired level to permit the automatic slip mechanism 48 to be operated, and with the drill stem 58 passing through the rotary table 2 and being within power actuated slip mechanism 48, one of the pedals on valve 256 is operated to direct fluid under pressure from fluid supply line 258 either into conduit 260 or conduit 262, and thence into fluid cylinder 49 to actuate the power slip mechanism 48. However, since it is necessary that the slip mechanism seat within the bowl of the rotary table 2 to hold the drill stem 58 against downward descent before engaging the back-up slips to unscrew the drill stem, a valve 72 is provided adjacent the fluid cylinder 49 so that a projection 49a on plunger 49b will engage a projection 70 on valve 72 so as to move valve 72 into open position only after slip mechanism 48 is seated in rotary table 2. With the valve 72 open, air is directed from fluid supply line 74 through open valve 72 to the manually controlled four-way valve 76. Then air is directed through conduit 75 into valve actuator 78 to actuate a slidable spool type plunger in four-way valve 80, the plunger of which valve is actuated by double acting valve actuator 78 to a position so that hydraulic fluid will be directed from pump 82 through hydraulic fluid supply conduits 84 and 86 through the four-way hydraulic valve 80 into conduit 88, which will urge the pistons within hydraulic cylinders 59 inward simultaneously and at a uniform rate of travel, so that the die head 60 will urge toothed die members 60a into gripping and holding relation with the lower half of the tool joint of drill stem 58, if used on drill stem, or into engagement with the collar of a pipe, if used on pipe. With the dies 60a in holding engagement with the drill stem or pipe, the drill stem or pipe is ready to be screwed together. The joint of drill stem 58a is then lowered until the pin or threaded portion thereof is in contact relation with the threads within the box portion of the drill stem 58, and with the die holders 164 in retracted position, as shown in FIG. 9, and with the slip guide pins 180 positioned as shown in FIGS. 8 and 9, the four-way air valve 264 is opened, which will direct air from air supply conduit 74 through two-way check valve 266 into air conduit 178 which leads to air cylinders 176 to cause friction elements 171 to engage the surface 170 of the brake ring. Upon engagement of the brake ring, which is made integral with ring 168, sufficient friction will be imparted to the ring to cause relative movement between ring 168 and drive ring 150 when drive ring 150 is rotated.

The drive ring 150 has cam faces 160 and 162 therein and since the die holders 164 are pivotally connected to ring 168 by links 167, the rotation of drive ring 150 will cause ring 168 to be retarded, which will cause the die holders 164 to be urged along one of the faces of cams within ring 150 to urge the dies 166 into gripping and holding engagement with the upper half of the tool joint of drill stem 58a when the device is used on drill stem. Simultaneously with air being directed to cylinder 176 to actuate brake 171, air will be directed through conduit 268 to direct air into double acting valve actuator 270, which actuates four-way hydraulic valve 272 which will actuate a valve mechanism therein to rotate the motor, fly wheel 116, and countershaft 120. With the valve 272 in this position, hydraulic fluid under pressure will be directed from hydraulic supply conduit 84 through branch conduit 274 through the four-way valve 272, conduit 276 leading to motor 114, with the hydraulic fluid returning from motor 114 passing out through conduit 278 through four-way hydraulic control valve, and thence into return conduit 280 and conduit 254 into reservoir R. When the motor 114 and fly wheel 116 have gained sufficient speed to turn the countershaft 120, the high speed clutch 126 is ready to be engaged, which will turn the pipe in the direction to screw the joint together.

To engage the high speed clutch 126 a four-way air control valve 282 is opened, which will direct air from air supply line 74 into air supply conduit 130 leading through a rotary fluid seal 284 into clutch 126, which is preferably of the axially expansible air tube type, which will cause the clutch 126 to engage sprocket 134 in driving relation with countershaft 120 which will drive through chain 140 and sprocket 138 to drive jack shaft 136 which has a sprocket 148 thereon, which sprocket is in driving relation with a chain 156 to drive sprocket 154 on the periphery of drive ring 150, and with the dies 166 fitted within slip holders 164 engaged with the upper half of the tool joint, the drill stem will be rotated and screwed together until a predetermined torque is reached, which torque may be regulated by the amount of air pressure on air supply line 74 which leads to clutch 126. When the predetermined torque is reached, if high speed clutch 126 generates sufficient torque, valve 282 is opened to neutral position, as is valve 264, whereupon the brake elements 171 will be disengaged by spring S, then by movement of four-way valve 76 to the other position, air will be directed through conduit 75a into double acting valve actuator 78, which will actuate the plunger of four-way valve 80 to direct hydraulic fluid from hydraulic fluid supply conduit 84 through branch conduit 86 thence through valve 80 into conduit 90 so as to urge the pistons within hydraulic cylinders 59 into retracted position and expel hydraulic fluid in the opposite end thereof out through conduit 88, valve 80 and branch conduit 87 into hydraulic fluid return conduit 254 and to reservoir R. Whereupon, upon release of power slip mechanism 48, the drill stem 58 is ready to be lowered.

If, after completing the screwing together of drill stem with the high speed clutch, which usually exerts a torque of approximately 50,000 inch lbs. on the drill stem, it is desired to tighten the tool joint of the drill stem with greater torque before disengaging the back-up slips 60a and rotary dies and slips from the tool joint of the drill stem, this can be accomplished by moving the lever of valve 282 to the other position, whereby air is released from high speed clutch 126 out through conduit 130 and air release port in valve 282, whereupon the air will be directed to air supply line through valve 282 into conduit 132 and through a rotary air seal 133 into air actuated low speed clutch 128, whereupon, the countershaft 120 will be connected in driving relation with motor 114 so as to rotate drive ring 150 in the manner as set out for the high speed clutch.

When it is desired to break out a tool joint of drill stem, the portions of drill stem 58—58a are moved into a position so that the lower half of the tool joint is within the range of travel of the jack 42 so that the make-up and break-out device 24 can be positioned to engage the upper half of the tool joint and the die engaging head 60 is positioned to engage the lower half of the tool joint. The lower half of the tool joint is positioned so that when the jack 42 is lowered and the power slips 48 are in uppermost or disengaged position, the elevators may be latched beneath the lower half of the tool joint or unlatched therefrom without interference with the make-up and break-out mechanism 24, with the drill stem in this position, the power slip mechanism 48 which surrounds the drill stem is lowered into the bowl of the rotary table 2 so that the slips thereof will wedgingly engage the drill stem and suspend the drill stem within the rotary table.

With the drill stem 58 thus suspended, the jack 42 is raised to the proper height so that the back-up dies 60a of die head 60 will engage and hold the lower half of the tool joint and the dies of slips 166 of die holders 164 engaged with the upper half of the tool joint, substantially in the position as shown in dashed outline in FIGS. 2, 5 and 10, and with the back-up dies moved into binding engagement with the lower half of the tool joint by hydraulic jack cylinders 59, the upper half of the drill stem is ready to be turned, as the adjustment of the slips, as hereinafter set out, will have been made previously.

The slip guide pins 180, which have been previously moved to the position as shown in FIGS. 10 and 11, by removing lock pin 184 after the plug 186 has been removed, then the ring 182 may be rotated with respect to drive ring 150, from the position as shown in FIGS. 8 and 9, to that shown in FIGS. 10 and 11, by using a socket wrench to engage the upper squared end of shaft 198 so as to rotate pinion 196 which is in mesh with a gear segment 202, to a position as shown in FIGS. 10 and 11, whereupon, pin 184 is replaced, which pin will engage within holes in drive ring 150 and ring 182, which holes are now in register, whereupon, the make-up and break-out mechanism 24 is ready to be used for breaking out a screw threaded joint of drill stem.

With the die holders 164 in position as shown in FIG. 11, which is the disengaged position, the dies 166 are brought into engagement with the periphery of the upper portion of the tool joint of the drill stem 58a by engaging friction elements 171 with the braking surface 170 of ring 168, which will cause a relative movement between ring 168 and drive ring 150, which will urge slip holding members 164 along cam faces 160 to engage the periphery of the tool joint of the drill stem 58a, as will best be seen in FIG. 10, as the links 167 are pivotally mounted on ring 168 and to the slip holder member 164. This is accomplished in the same manner as set out above to make up the tool joint. However, the motor 114 will be operated in the opposite direction of rotation by moving four-way air control valve 264 to the other position from that set out above for making up screw threaded joints. Whereupon, air is directed through two-way check valve 266 into conduit 178 and air actuated cylinder 176 to perform the braking operation on ring 170 to engage die holder or slip 164, and simultaneously air is directed from air supply line 74 through conduit 286 into double acting valve actuator 270 to shift valve mechanism therein, whereby hydraulic fluid will be directed from hydraulic supply conduit 84 through branch conduit 274 in and through four-way hydraulic valve 272, thence through conduit 278 into hydraulic motor 114 to rotate the motor 114 in a direction to unscrew the threaded joint. The hydraulic fluid exhausted from motor 114 will be directed through conduit 276 through valve 272 and exhausted into conduit 280 leading to return conduit 254 and reservoir R.

As the motor 114 is being rotated, the fly wheel 116 thereof attains considerable momentum, and with the countershaft 120 being driven through sprocket and chain drive 118, 122 and 124, the low speed clutch 128 will be engaged by moving the lever of four-way air valve 282 to the position to direct air through conduit 132 and rotary air seal 133 into low speed clutch 128, whereupon, the inertia of the fly wheel 116, together with the power of the motor 114 will exert torque on the screw threaded joint of the drill stem 58 of 50,000 inch lbs. to 200,000 inch lbs. depending on the air pressure, which is usually sufficient to break out or loosen the joint; however, if the tool joint is not broken out by this torque, the air valve 282 is released and the four-way air valve 288 is actuated to direct air from air supply conduit 74 into conduit 290 leading to air cylinder 226, simultaneously, the air within the other side of cylinder 226 will be exhausted through conduit 292 and out through exhaust port of four-way valve 288. The air pressure directed through conduit 290 will actuate lever 224 to apply braking action by brake band 220 to the periphery of low speed clutch driven ring 128, whereupon, the drive ring 150 will be held in fixed relation with respect to housing 50 by sprockets and chains which interconnect clutch 128 with drive ring 150, and with the slips 166 within drive ring 150 engaged with the drill stem, air is directed into conduit 294 simultaneously with the directing of air into conduit 290, which will cause double acting valve actuator 296 to actuate a valve plunger within four-way hydraulic valve 298 so as to direct hydraulic fluid from supply conduit 84 into branch conduit 300, thence through four-way hydraulic valve 298 to direct hydraulic fluid into conduit 210 which leads to hydraulic jack cylinder 208 which will move piston rod 214 outward to move the entire housing assembly 50 about the axis of drive ring 150 and the drill stem therein, and with the slips 166 engaged with the upper half of the tool joint, a very high torque may be exerted on the drill stem 58a, as the diameter of the hydraulic cylinder 208 may be of such cross-sectional area, coupled with the leverage by the pivot center of housing 50 which rotates on bearing 52, which leverage is such that in moving the housing up to one million inch lbs. of torque may be generated. This operation requires only a relatively small arcuate movement of one drill stem with respect to the other to break the screw threaded joint.

The hydraulic jack cylinder 208 is double acting, and is then returned to normal position by moving valve 288 to the opposite position, which simultaneously directs air to conduit 292 and to air cylinder 226 to release the brake 220, and directs air into conduit 302 which leads to double acting valve actuator 206 to move the valve plunger within valve 298 to a position whereby hydraulic fluid is directed from hydraulic supply conduit 84 through conduit 300, valve 298 and conduit 213 into the opposite end of hydraulic jack cylinder to return the connecting rod 214 to normal position, with the hydraulic fluid exhausted therefrom passing out through conduit 210, valve 298 and conduit 301 into hydraulic fluid return line 254 and to reservoir R.

The motor 114 is again energized to drive countershaft 120, and the unscrewing operation may be accomplished by engaging the low speed clutch 128 until the joint is sufficiently loose, then the high speed clutch 126 may be engaged to spin the drill stem apart at a relatively high speed.

A relief valve V is provided within by-pass conduit B to relieve excess pressure from the outlet side of pump 82, which conduit B leads to reservoir R, thereby permitting the pump 82 to operate at a predetermined pressure.

Relief valves 304 and 306 are positioned in the by-pass conduit 305 which extends between conduits 276 and 278 leading to motor 114, thereby enabling the by-passing of hydraulic fluid through relief valve 304 and 306 into conduit 305 in event the motor 114 becomes stalled.

The control unit, as shown in FIG. 13 is designated generally at 10, has all the control valves and switches thereon within easy reach of the operator, together with the gauges to indicate the particular pressure in the respective lines. The ignition switch for power unit 4 is indicated at 308, which enables said power unit to be started by remote control.

A master control air valve 310 is provided for turning air into the system or releasing air therefrom.

A throttle control metering valve 312 is provided on the panel board to accurately throttle the speed of the power unit 4.

The air clutch which operates the hydraulic pump, which clutch is not shown, is operated by a three-way air control valve 314. A remote control, four-way air valve 316 is provided to shift to low and reverse gears in the transmission. A further valve 318 is provided for shifting to high speed. An air pressure control valve 257 is provided within air line 258 leading to pedal control valve 256 of slip mechanism 48 to control the slips in the desired manner.

Two-way check valves are shown between air line 75 and 75a, 130 and 132, 242 and 244 and between air lines 290 and 292, each of which two-way check valves has a pressure gauge thereon so that the pressure can be gauged and determined in the particular line to which air is being directed.

Having thus described the invention, what is claimed is:

1. A machine for rotating a length of screw threaded pipe relative to another length of screw threaded pipe, which machine comprises; a frame, a one-piece, concentric, continuous circular, rotatable drive ring mounted on said frame in journaled relation and having an axial opening formed therethrough, relatively movable die holders mounted wholly within said drive ring, pipe engaging dies mounted on each said die holder and each having the respective pipe engaging dies thereof movable radially inward toward the axis of said drive ring and rotatable therewith, cam means within said axial opening, cam engaging faces on each die holder to complementally engage said respective cam faces within said axial opening of said ring to move said die holders therein to engage a length of pipe upon limited rotation of said drive ring relative to said die holders, pipe holding means mounted on and attached to said frame below said drive ring and being engageable with the other of said lengths of pipe to selectively hold said last mentioned length of pipe against relative rotary movement when said last mentioned pipe holding means is in one position, a fluid actuated motor mounted on said frame to impart rotary movement to said drive ring, a low speed, fluid actuated, torque limiting clutch mounted on said frame, a high speed, fluid actuated clutch mounted on said frame, said clutches being selectively connectable in driving relation with said ring, said fluid motor being connected in driving relation with said clutches, and valve means for selectively directing fluid under pressure to said clutches.

2. A machine for rotating a length of screw threaded pipe relative to another length of screw threaded pipe as defined in claim 1; wherein (a) a fly wheel is secured to the shaft of said motor to exert inertia on said rotatable element, and (b) said low speed clutch is adjusted to slip at a predetermined torque.

3. A machine as defined in claim 1, wherein one portion of said frame is arcuately movable with respect to another portion of said frame and wherein hydraulic jack means is provided to interconnect between said portions of said frame to impart relative movement therebetween, said drive ring being mounted on said one portion and said holding means being mounted on the other said portion, said ring and said holding means being concentric to the relative arcuate movement between said portions, remote control means being provided for directing hydraulic fluid to said hydraulic jack means, and selectively operative means for securing said drive ring against rotation in said one frame portion.

4. A machine for rotating a length of screw threaded pipe relative to another length of screw threaded pipe, which machine comprises: a frame, a one-piece concentric, continuous circular rotatable drive ring mounted on said frame in journaled relation and having an axial opening formed therethrough, relatively movable die holders mounted wholly within said drive ring, pipe engaging dies mounted on each said die holder and each having the respective pipe engaging dies thereof movable radially inward toward the axis of said drive ring and rotatable therewith, cam means within said axial opening, cam engaging faces on each said die holder to complementally engage the respective cam faces within said axial opening of said ring to move said die holders therein to engage a length of pipe upon limited rotation of said drive ring relative to said die holders, pipe holding means mounted on and attached to said frame below said drive ring and being engageable with the other of said lengths of pipe to selectively hold said last mentioned length of pipe against relative rotary movement when said last mentioned pipe holding means is in one position, a relatively rotatable ring mounted on said drive ring and being rotatable with respect thereto within predetermined limits, linkage interconnecting said die holders and said relatively rotatable ring, a relatively movable ring mounted on said drive ring for limited arcuate movement with respect thereto, abutment means mounted on said movable ring, mounted on said drive ring in a predetermined position with respect thereto, said cam faces on said die holders being engageable with said respective abutments on said relatively movable ring when said die holders are moved in one direction relative to said drive ring to urge said die holders radially outward, means engageable with said drive ring and said relatively movable ring to move said relatively movable ring with respect to said drive ring to cause said die holders to move outwardly upon reverse rotation of said drive ring, and power means mounted on said frame to impart rotary movement to said drive ring.

References Cited in the file of this patent

UNITED STATES PATENTS

| | | |
|---|---|---|
| 1,818,435 | Smith et al. | Aug. 11, 1931 |
| 2,181,641 | Hicks | Nov. 28, 1939 |
| 2,398,512 | Berry | Apr. 16, 1946 |
| 2,450,934 | Calhoun | Oct. 12, 1948 |
| 2,550,045 | De Hetre | Apr. 24, 1951 |
| 2,566,561 | Edelberg | Sept. 4, 1951 |
| 2,580,247 | Seconde et al. | Dec. 25, 1951 |
| 2,618,468 | Lundeen | Nov. 18, 1952 |
| 2,639,894 | Smith | May 26, 1953 |
| 2,646,966 | Lindberg | July 28, 1953 |
| 2,650,070 | Lundeen | Aug. 25, 1953 |
| 2,657,014 | Webster | Oct. 27, 1953 |
| 2,668,689 | Cormany | Feb. 9, 1954 |
| 2,705,614 | McKibben et al. | Apr. 5, 1955 |
| 2,737,839 | Paget | Mar. 13, 1956 |
| 2,780,950 | Province | Feb. 12, 1957 |
| 2,785,715 | Brundell et al. | Mar. 19, 1957 |
| 2,846,909 | Mason | Aug. 12, 1958 |
| 2,856,044 | Koenig et al. | Oct. 14, 1958 |
| 2,924,983 | Curran | Feb. 16, 1960 |
| 2,960,311 | Scott | Nov. 15, 1960 |
| 2,989,880 | Hesser et al. | June 27, 1961 |
| 3,025,733 | Soodnizin | Mar. 20, 1962 |